United States Statutory Invention Registration [19]

[11] Reg. Number: H871

Chin [43] Published: Jan. 1, 1991

[54] FROTH FLOTATION OF MINERAL ORES

[75] Inventor: Ti-Hua Chin, Voorhees, N.J.

[73] Assignee: BP America Inc., Cleveland, Ohio

[21] Appl. No.: 314,443

[22] Filed: Feb. 23, 1989

[51] Int. Cl.[5] ..... B03D 1/14

[52] U.S. Cl. ..... 209/166; 209/168; 209/169; 209/170; 209/164

[58] Field of Search ..... 209/168, 169, 170, 164

[56] References Cited

U.S. PATENT DOCUMENTS

| | | | |
|---|---|---|---|
| 4,347,126 | 8/1982 | McGarry | 209/168 |
| 4,347,127 | 8/1982 | Duttera | 209/168 |
| 4,424,123 | 1/1984 | Parlman | 209/166 |
| 4,514,291 | 4/1985 | McGarry et al. | 209/170 |
| 4,605,494 | 8/1986 | Burgess | 209/170 |
| 4,650,567 | 3/1987 | McGarry | 209/170 |

*Primary Examiner*—Richard D. Lovering
*Assistant Examiner*—John M. Covert
*Attorney, Agent, or Firm*—Michael F. Esposito; David J. Untener; Larry W. Evans

[57] ABSTRACT

A process for the froth flotation beneficiation and separation of molybdenite from copper mining by-product is disclosed.

10 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FROTH FLOTATION OF MINERAL ORES

BACKGROUND OF THE INVENTION

This invention relates to the froth flotation of ores and in particular to the froth flotation of molybdenum containing ores.

Froth flotation procedures for the recovery of desired minerals from ores containing the same have been employed for many years. Froth flotation operates to separate finely ground valuable minerals from their associated gangue. In general, the frothing process is carried out by introducing air into a pulp of finely divided ore in water containing a frothing or foaming agent whereby a froth is formed. The minerals with a specific affinity for air bubbles rise to the surface in the froth and are thus separated from the gangue wetted by water.

Typically, the flotation process consists of crushing the mineral containing ore; contacting the resulting finely ground mixtures of particles of mineral and gangue with flotation agents, frothing agents and other additives; contacting the treated mineral particles with air bubbles to buoy or lift the mineral to the surface and recovering the desired metal from the resulting froth.

Froth flotation is the principal means of concentrating copper, lead, molybdenum, phosphate, zinc, potash ores and numerous other minerals. In the case of recovering molybdenum, upon which the present invention is particularly focused, it is well known that a significant portion of the world supply of molybdenum is recovered as a by-product of copper mining, namely molybdenite, $MoS_2$. Copper mining operations produce, as a by-product, a concentrate containing copper and molybdenum (as molybdenite) and typically the molybdenite is separated from the copper by froth flotation as generally described hereinbefore.

U.S. Pat. Nos. 4,347,126 and 4,347,127 disclose apparatus and methods for the froth flotation of coal and other particulate mineral matter. In accordance with the method of froth flotation disclosed in said U.S. Pat. Nos. 4,347,126 and 4,347,127, an input slurry of particulate matter is sprayed under pressure through a spray nozzle into a flotation cell so that the particulate matter is dispersed through an aeration zone into the liquid surface in the cell to create a froth on the liquid surface in which a quantity of the desired particulate matter is floating.

It has now been found that utilization of the teachings of said U.S. Pat. Nos. 4,347,126 and 4,347,127 to recover and beneficiate molybdenite from bulk molybdenite concentrate containing impurities including copper, results in a significant improvement over conventional flotation procedures used for recovering molybdenite.

SUMMARY OF THE INVENTION

Accordingly, it is one object of the present invention to provide an improved froth flotation separation and beneficiation process for the recovery and beneficiation of molybdenite.

It is another object of this invention to provide a froth flotation separation and beneficiation process which provides for the increased recovery of molybdenite.

Still another object of the present invention is to provide a froth flotation separation and beneficiation process which provides for the recovery of higher quality molybdenite than is recovered by conventional separation processes.

These and other objects are achieved herein by a process for the froth flotation separation of the components of a molybdenite containing ore comprising the steps of:

(i) spraying, under pressure, a pulp of molybdenite containing ore onto a liquid surface to create a froth on said liquid surface; and (ii) removing the froth containing molybdenite from the liquid surface.

DETAILED DESCRIPTION OF THE INVENTION

In accordance with the present invention, it has now been found that the methods of froth flotation disclosed in U.S. Pat. Nos. 4,347,126 and 4,347,127, the contents of which are incorporated herein by reference, are highly effective for the beneficiation and recovery of molybdenite. It has been surprisingly found herein that the froth flotation process of said U.S. patents provides a superior molybdenite product and equivalent or better molybdenite recovery than is obtained by conventional flotation processes.

Figure 1:
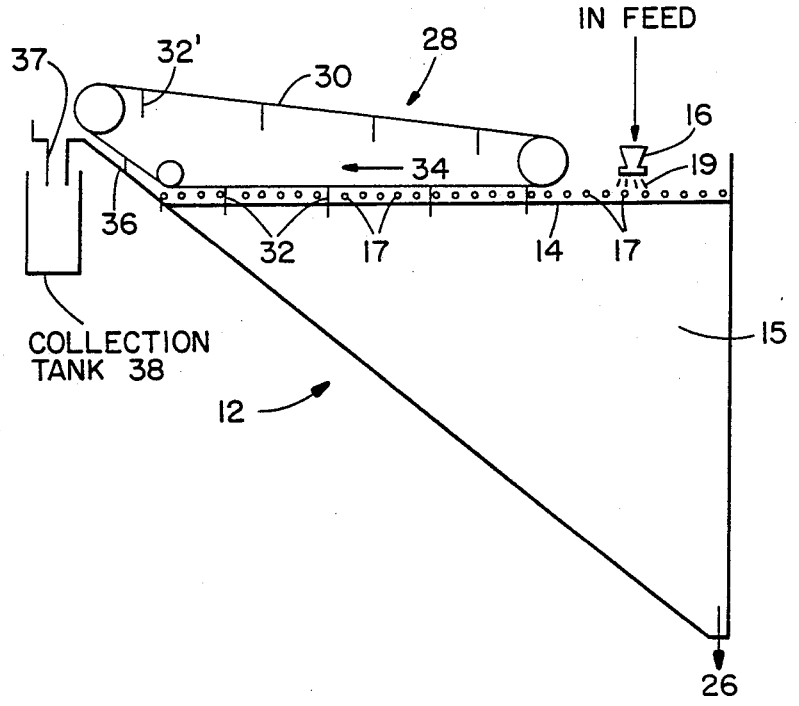
FIG. 1 is an elevational, cross-sectional side view of a flotation tank arrangement by which the froth flotation process of the present invention is carried out.

In carrying out the process of the present invention a pulp of copper-molybdenite concentrate is sprayed through an aeration zone such that substantial quantities of air are sorbed by the sprayed fine droplets of the pulp. In referring to the drawings herein, FIG. 1 illustrates a flotation tank 12 filled with water to level 14. In operation, a pulp of copper-molybdenite concentrate, associated impurities, and if desired additional additives, such as frothers like methyl isobutylcarbinol, and/or collectors, such as fluid hydrocarbons, like fuel oil, is sprayed through at least one spray nozzle 16 positioned at a distance above the water level in tank 12. In alternative embodiments, two or more nozzles can be used to spray pulp and/or any other desired ingredients into the tank.

A stream of copper-molybdenite concentrate is pumped under pressure through a manifold to the spray nozzle 16 wherein the resultant shearing forces spray the slurry as fine droplets such that they are forcefully jetted into the mass of a continuous water bath 15 in tank 12 to form a froth 17. The molybdenite particles in the floating froth created by nozzle 16 can be removed from the water surface by, e.g., a skimming arrangement 28 in which an endless conveyor belt 30 carries a plurality of spaced skimmer plates 32 depending therefrom. The skimmer plates are pivotally attached to the conveyor belt to pivot in two directions relative to the belt, and the bottom run of the belt is positioned above and parallel to the water surface in the tank. The plates 32 skim the resultant froth on the water surface in a first direction 34 toward a discharge surface 36, preferably upwardly inclined, extending from the water surface, through a chute 37 to a collection tank 38 arranged at one side of the flotation tank. Preferred flotation tank arrangements useful in the practice of the present invention are disclosed in concurrently filed U.S. application Ser. Nos. 314,458 and 314,442, now U.S. Pat. No. 4,913,805.

Spray nozzle 16 may be a hollow jet nozzle as is commercially available from Spraying Systems Co., Wheaton, Ill. Of course, it is contemplated herein that other types of nozzles, which function to provide the desired results as hereinbefore described, may also be used. The nozzles are preferably constructed of stainless steel, ceramic or other suitable hard metal to avoid erosion by the various particles in the pulp being pumped therethrough. The nozzles are preferably supplied with slurry in the supply manifolds at a pressure in the range of 5 to 40 psi, and more preferably in a pressure range of 7 to 20 psi. Preferred spray nozzles for the purposes of the present invention are those disclosed, for example, in U.S. Pat. Nos. 4,514,291 and 4,650,567, the entire contents of which are incorporated herein by reference. These patents disclose open flow, spiral nozzles which are particularly useful in the practice of the present invention.

Each nozzle 16 may be tilted at an angle with respect to a vertical, (i.e., the position of the nozzle relative to the liquid surface level), such that it functions to direct the flow of froth in a direction towards the skimmer arrangement 28. However, the angle of incidence does not appear to be critical, and the vertical positioning shown in FIG. 1 may be preferred to create a condition most conducive to agitation and froth generation at the water surface. It appears to be significant that the agitation created by the nozzle sprays define a zone of turbulence extending a limited distance beneath the water surface level. Too much turbulence may actually reduce the amount of frothing produced at the water surface. Among other ways, the depth of the turbulence zone may be adjusted by varying the supply pressure of the slurry in the supply manifolds and also the distance of the nozzles above the water surface.

Figure 2:
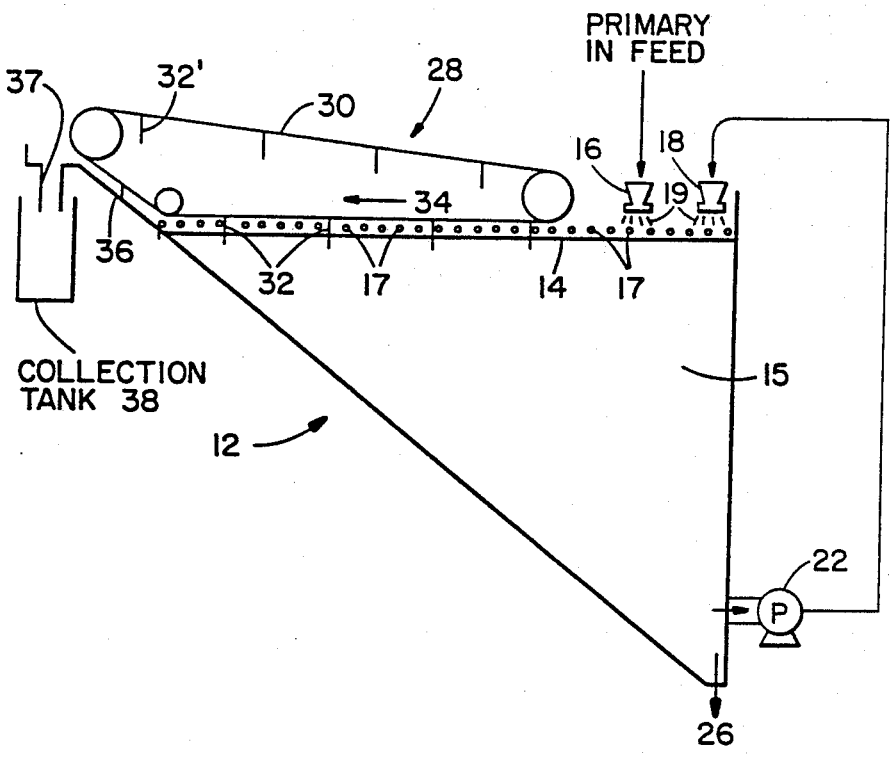
FIG. 2 is also an elevational, cross-sectional side view of another flotation tank arrangement illustrating a recycling embodiment encompassed by the present invention.

In one operation utilizing the present invention, as shown in FIG. 2, a recycling technique is employed to further improve the efficiency. In the recycling technique, molybdenite particles which do not float after being sprayed through a spray nozzle 16, designated a primary spray nozzle in context with this embodiment, are recycled to a further recycle spray nozzle 18 to provide the particles a second opportunity for recovery. A pump 22 draws the slurry and feeds it to the recycle spray nozzle(s). At least one recycle spray nozzle 18, which may be the same type of nozzle as primary spray nozzle 16, is provided above the tank for respraying into the surface of the water bath. The recycled spray nozzle(s) 18 is positioned in proximity to the primary spray nozzle(s) 16. In alternative embodiments, further stages of recycling may be provided by adding additional recycle nozzles in the tank.

The utilization of the present flotation process provides superior molybdenite quality as well as improved recovery. While not wishing to be bound by theory, it is believed that the merits of the present process are based, inter alia, on the spray flotation mechanism which creates both macrobubbles and microbubbles and allows for intimate contact between said bubbles and fine particles. The froth generation occurs on the top region of the liquid in the tank and the froth is skimmed off, minimizing the chances of being contaminated with gangue-laden liquid. The generation of bubbles in the surface region of the pulp is the foundation for good absorption of the fine mineral particles to the air bubbles and for good isolation of flotation action in the surface region. The downward momentum imparted by the vigorous spray action facilitates sinking and settling of the fine non-floatable impurities so that a good separation is achieved.

Figure 3:
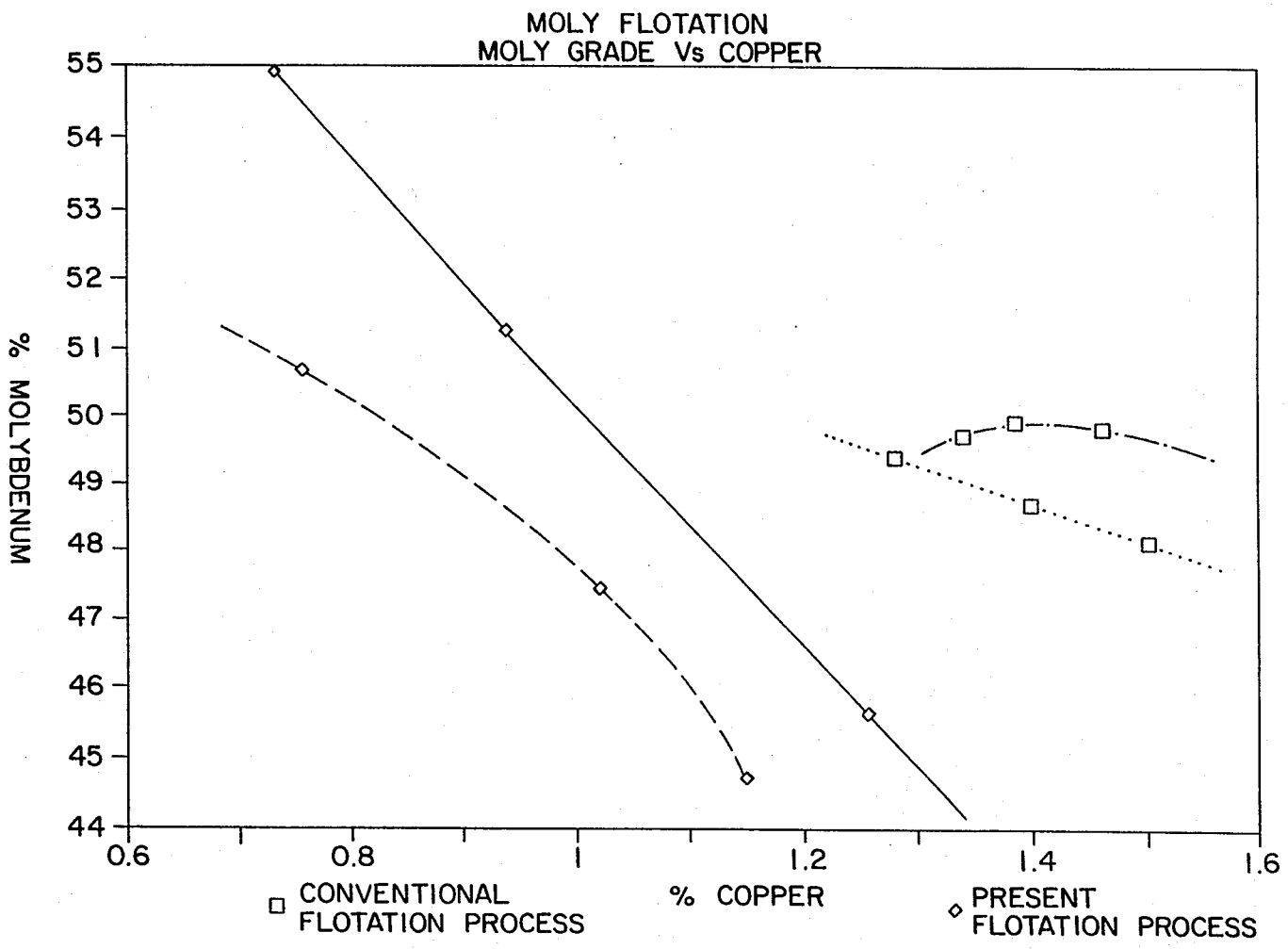
FIGS. 3–5 are graphical depictions illustrating improved results achieved by the present process.
Figure 4:
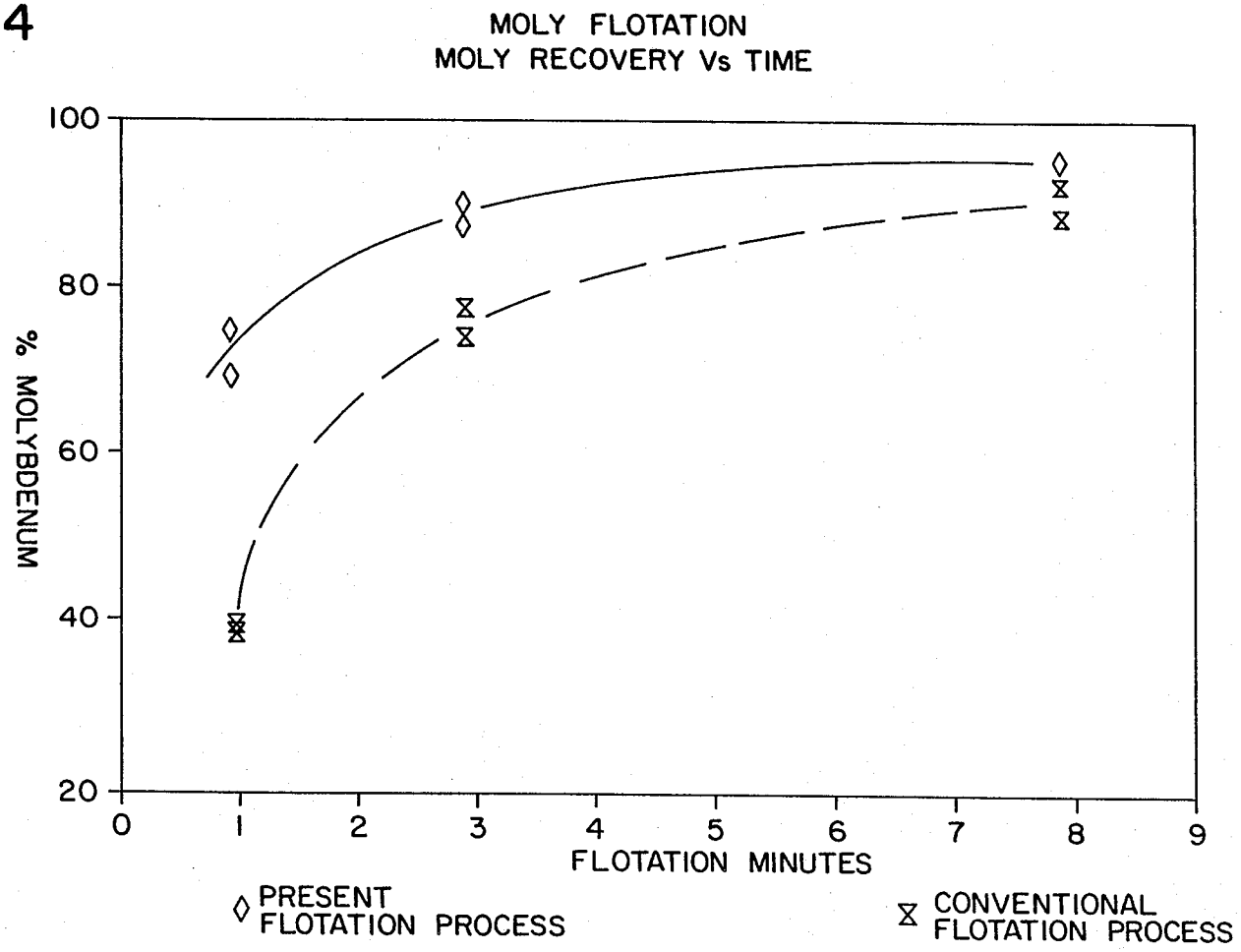
Figure 5:
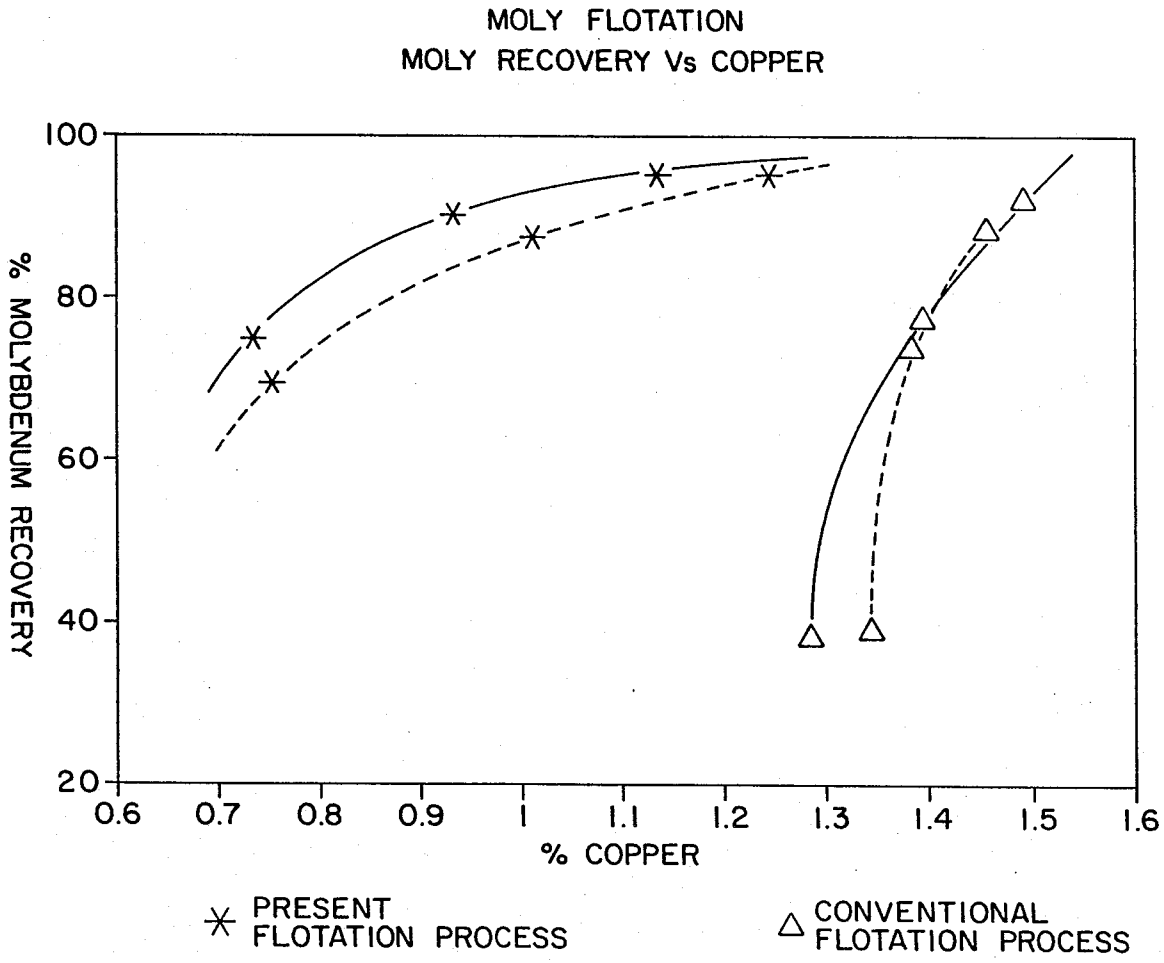

In comparison with a conventional flotation apparatus and process (conventional mechanical subaeration apparatus), the improved results achieved by the present invention are depicted by the graphical illustrations of FIGS. 3 through 5.

In particular, the results depicted in FIG. 3 demonstrate that the present process achieves higher molybdenum grade and lower copper contamination than conventional flotation.

The results depicted in FIG. 4 demonstrate that molybdenum recovery is 70% in the first minute of the flotation process of the present invention in comparison with 40% for the conventional prior art process; 90% recovery for the present process versus 75% for the conventional prior art process after 3 minutes of flotation. After a total of 8 minutes of flotation, the present process recovers 95% molybdenum against the conventional prior art process of 90%.

The results depicted in FIG. 5 demonstrate that at comparable recoveries, the present process achieves significantly better product quality than the conventional prior art process and also at comparable product grade, the present process achieves significantly higher recoveries than the prior art. Most significantly, the prior art process cannot achieve the same low copper contaminant level as does the present process, regardless of molybdenum recovery level. Thus superior selectivity is demonstrated by the present process. The feed ore in the flotation processes carried out in compiling the data represented in FIGS. 3–5 comprised an average of 2–3% copper and 47.86% molybdenum.

The data depicted by FIGS. 3–5 clearly illustrate inter alia, that the process of the present invention produces a higher grade molybdenite and lower copper contaminant than the conventional flotation process and further illustrates that recoveries are better than those obtained with conventional flotation in a shorter period of flotation.

While several embodiments and variations of a method and apparatus for froth flotation separation of the components of a slurry have been described in detail, wherein, it should be apparent that the teachings and disclosure herein will suggest many other embodiments and variations to those skilled in this art.

I claim:

1. A method for froth flotation beneficiation and separation of molybdenite particles from a molybdenite concentrate containing impurities, said method comprising the steps of:

(i) spraying a pulp of said molybdenite concentrate through at least one primary spray nozzle onto a liquid surface to create a froth on the surface in which a quantity of molybdenite particles is floating, while a quantity of particulate materials including impurities and molybdenite particles sink in the liquid; and (ii) removing the froth from the liquid surface.

2. The method of claim 1 wherein said pulp of said molybdenite concentrate is conditioned with a frothing agent and a collector.

3. The method of claim 1 wherein the sinking particulate materials from the spray of said primary spray nozzle are collected and resprayed onto said liquid surface through a recycle spray nozzle whereby at least a portion of the recycled material floats as a froth containing molybdenite particles on the liquid surface.

4. The method of claim 1 wherein said primary spray nozzle is a spiral, open-flow spray nozzle.

5. The method of claim 3 wherein said recycle spray nozzle is a spiral, open-flow spray nozzle.

6. The method of claim 1 wherein said spraying of said pulp of molybdenite concentrate through at least one primary spray nozzle is carried out at a pressure of from about 5 to about 40 psi.

7. A method for the froth flotation beneficiation and separation of molybdenite from a molybdenite concentrate containing impurities, said method comprising the steps of:

(i) spraying a pulp of said molybdenite concentrate through at least primary spray nozzle onto a liquid surface to create a froth on the surface in which a quantity of molybdenite is floating;

(ii) collecting sinking materials from the spray of said primary nozzle and respraying said collected materials through a recycle spray nozzle onto said liquid surface whereby at least a portion of the recycled materials floats as a froth on the liquid surface; and, (iii) removing the froth from the liquid surface.

8. The method of claim 7 wherein said pulp of said molybdenite concentrate is conditioned with a frothing agent and a collector.

9. The method of claim 7 wherein said primary spray nozzle is a spiral, open-flow spray nozzle.

10. The method of claim 7 wherein said recycle spray nozzle is a spiral, open-flow nozzle.

* * * * *